United States Patent [19]

Lentine et al.

[11] Patent Number: 4,967,068
[45] Date of Patent: Oct. 30, 1990

[54] SINGLE-ENDED OPTICAL LOGIC ARRANGEMENT

[75] Inventors: Anthony L. Lentine, St. Charles; David A. B. Miller, Fairhaven, both of N.J.

[73] Assignee: AT&T Bell Laboratories, Murray Hill, N.J.

[21] Appl. No.: 399,638

[22] Filed: Aug. 28, 1989

[51] Int. Cl.⁵ ............................................. H01J 40/14
[52] U.S. Cl. ............................ 250/213 A; 250/211 J; 377/102
[58] Field of Search .................... 250/211 J, 213 A; 365/109, 110, 112; 377/102

[56] References Cited

U.S. PATENT DOCUMENTS

| Re. 32,893 | 3/1989 | Miller | 377/102 |
| 4,546,244 | 10/1985 | Miller | 250/211 J |
| 4,751,378 | 6/1988 | Hinton et al. | 250/211 J |
| 4,754,132 | 6/1988 | Hinton et al. | 250/211 J |
| 4,904,858 | 2/1990 | LaMarche | 250/213 A |
| 4,904,859 | 2/1990 | Goossen et al. | 250/211 J |
| 4,914,286 | 4/1990 | Chirovsky et al. | 250/213 A |

OTHER PUBLICATIONS

*MIT Video Couse Study Guide*, Jonathan Allen, "Part 1: NMOS Integrated Circuit Design, Part II: CMOS Integrated Circuit Design", 4–8, 4–10, 5-3, 18–12, 18–13, 18–14, 18–15, 19-3, No. 78-2100.

"Photonic Ring Counter and Differential Logic Gate Using the Symmetric Self-Electrooptic Effect Device", A. L. Lentine, et al., *CLEO '88/Tuesday Morning/52*, Apr. 26.

Primary Examiner—Edward P. Westin
Attorney, Agent, or Firm—Ross T. Watland

[57] ABSTRACT

Apparatus having a plurality of photodetectors interconnected to form an electrical circuit corresponding to any given logic function comprising at least two of the four basic AND, OR, NAND, and NOR logic operations. The apparatus performs optical logic without optical cascading since the electrical circuit controls the generation of an optical output beam based on the value that the given logic function assumes in response to a plurality of optical signal beams each incident on at least one of the photodetectors. A complementary optical output is obtained and time-sequential operation is effected when two, serially connected quantum well p-i-n diodes comprising an S-SEED are used to generate optical output beams in response to the voltage developed by the electrical circuit of interconnected photodetectors.

22 Claims, 7 Drawing Sheets

| D | C | B | A | E | $i_A$ | $i_B$ | $i_{AB}$ | $i_C$ | $i_{AB+C}$ | $i_D$ | $i_{(AB+C)D}$ |
|---|---|---|---|---|---|---|---|---|---|---|---|
| 0 | 0 | 0 | 0 | 0 | $.5P_0$ | $.5P_0$ | $.5P_0$ | $.5P_0$ | $P_0$ | $P_0$ | $P_0$ |
| 0 | 0 | 0 | 1 | 0 | $.5P_1$ | $.5P_0$ | $.5P_0$ | $.5P_0$ | $P_0$ | $P_0$ | $P_0$ |
| 0 | 0 | 1 | 0 | 0 | $.5P_0$ | $.5P_1$ | $.5P_0$ | $.5P_0$ | $P_0$ | $P_0$ | $P_0$ |
| 0 | 0 | 1 | 1 | 0 | $.5P_1$ | $.5P_1$ | $.5P_1$ | $.5P_0$ | $.5(P_0+P_1)$ | $P_0$ | $P_0$ |
| 0 | 1 | 0 | 0 | 0 | $.5P_0$ | $.5P_0$ | $.5P_0$ | $.5P_1$ | $.5(P_0+P_1)$ | $P_0$ | $P_0$ |
| 0 | 1 | 0 | 1 | 0 | $.5P_1$ | $.5P_0$ | $.5P_0$ | $.5P_1$ | $.5(P_0+P_1)$ | $P_0$ | $P_0$ |
| 0 | 1 | 1 | 0 | 0 | $.5P_0$ | $.5P_1$ | $.5P_0$ | $.5P_1$ | $.5(P_0+P_1)$ | $P_0$ | $P_0$ |
| 0 | 1 | 1 | 1 | 0 | $.5P_1$ | $.5P_1$ | $.5P_1$ | $.5P_1$ | $P_1$ | $P_0$ | $P_0$ |
| 1 | 0 | 0 | 0 | 0 | $.5P_0$ | $.5P_0$ | $.5P_0$ | $.5P_0$ | $P_0$ | $P_1$ | $P_0$ |
| 1 | 0 | 0 | 1 | 0 | $.5P_1$ | $.5P_0$ | $.5P_0$ | $.5P_0$ | $P_0$ | $P_1$ | $P_0$ |
| 1 | 0 | 1 | 0 | 0 | $.5P_0$ | $.5P_1$ | $.5P_0$ | $.5P_0$ | $P_0$ | $P_1$ | $P_0$ |
| 1 | 0 | 1 | 1 | 1 | $.5P_1$ | $.5P_1$ | $.5P_1$ | $.5P_0$ | $.5(P_0+P_1)$ | $P_1$ | $.5(P_0+P_1)$ |
| 1 | 1 | 0 | 0 | 1 | $.5P_0$ | $.5P_0$ | $.5P_0$ | $.5P_1$ | $.5(P_0+P_1)$ | $P_1$ | $.5(P_0+P_1)$ |
| 1 | 1 | 0 | 1 | 1 | $.5P_1$ | $.5P_0$ | $.5P_0$ | $.5P_1$ | $.5(P_0+P_1)$ | $P_1$ | $.5(P_0+P_1)$ |
| 1 | 1 | 1 | 0 | 1 | $.5P_0$ | $.5P_1$ | $.5P_0$ | $.5P_1$ | $.5(P_0+P_1)$ | $P_1$ | $.5(P_0+P_1)$ |
| 1 | 1 | 1 | 1 | 1 | $.5P_1$ | $.5P_1$ | $.5P_1$ | $.5P_1$ | $P_1$ | $P_1$ | $P_1$ |

FIG. 8

| D | C | B | A | E | $i_A$ | $i_B$ | $i_{AB}$ | $i_C$ | $i_D$ | $i_{CD}$ | $i_{AB+CD}$ |
|---|---|---|---|---|---|---|---|---|---|---|---|
| 0 | 0 | 0 | 0 | 0 | $P_0$ | $P_0$ | $P_0$ | $P_0$ | $P_0$ | $P_0$ | $2P_0$ |
| 0 | 0 | 0 | 1 | 0 | $P_1$ | $P_0$ | $P_0$ | $P_0$ | $P_0$ | $P_0$ | $2P_0$ |
| 0 | 0 | 1 | 0 | 0 | $P_0$ | $P_1$ | $P_0$ | $P_0$ | $P_0$ | $P_0$ | $2P_0$ |
| 0 | 0 | 1 | 1 | 1 | $P_1$ | $P_1$ | $P_1$ | $P_0$ | $P_0$ | $P_0$ | $P_0+P_1$ |
| 0 | 1 | 0 | 0 | 0 | $P_0$ | $P_0$ | $P_0$ | $P_1$ | $P_0$ | $P_0$ | $2P_0$ |
| 0 | 1 | 0 | 1 | 0 | $P_1$ | $P_0$ | $P_0$ | $P_1$ | $P_0$ | $P_0$ | $2P_0$ |
| 0 | 1 | 1 | 0 | 0 | $P_0$ | $P_1$ | $P_0$ | $P_1$ | $P_0$ | $P_0$ | $2P_0$ |
| 0 | 1 | 1 | 1 | 1 | $P_1$ | $P_1$ | $P_1$ | $P_1$ | $P_0$ | $P_0$ | $P_0+P_1$ |
| 1 | 0 | 0 | 0 | 0 | $P_0$ | $P_0$ | $P_0$ | $P_0$ | $P_1$ | $P_0$ | $2P_0$ |
| 1 | 0 | 0 | 1 | 0 | $P_1$ | $P_0$ | $P_0$ | $P_0$ | $P_1$ | $P_0$ | $2P_0$ |
| 1 | 0 | 1 | 0 | 0 | $P_0$ | $P_1$ | $P_0$ | $P_0$ | $P_1$ | $P_0$ | $2P_0$ |
| 1 | 0 | 1 | 1 | 1 | $P_1$ | $P_1$ | $P_1$ | $P_0$ | $P_1$ | $P_0$ | $P_0+P_1$ |
| 1 | 1 | 0 | 0 | 1 | $P_0$ | $P_0$ | $P_0$ | $P_1$ | $P_1$ | $P_1$ | $P_0+P_1$ |
| 1 | 1 | 0 | 1 | 1 | $P_1$ | $P_0$ | $P_0$ | $P_1$ | $P_1$ | $P_1$ | $P_0+P_1$ |
| 1 | 1 | 1 | 0 | 1 | $P_0$ | $P_1$ | $P_0$ | $P_1$ | $P_1$ | $P_1$ | $P_0+P_1$ |
| 1 | 1 | 1 | 1 | 1 | $P_1$ | $P_1$ | $P_1$ | $P_1$ | $P_1$ | $P_1$ | $2P_1$ |

FIG. 9

SINGLE-ENDED OPTICAL LOGIC ARRANGEMENT

CROSS-REFERENCE TO RELATED APPLICATION

This application is related to U.S. Pat. No. 4,959,534, "Differential Optical Logic Arrangement", assigned to the assignee of the present invention.

TECHNICAL FIELD

This invention relates to optoelectronic apparatus.

BACKGROUND AND PROBLEM

Many types of logic devices have been proposed for optical computing and photonic switching. All of these must have the gain required to cascade devices and at least a minimum functionality to perform general Boolean logic functions by optically interconnecting the devices. (It is always possible to implement a Boolean logic function using, for example, a cascaded arrangement of NOR gates.) It is clearly preferable, from an implementation standpoint, that the devices are physically, sufficiently functional to be easy to use. For example, a "three-terminal" device is clearly preferable to a "two-terminal" device because the input/output isolation afforded by three-terminal devices removes the problem of critical biasing associated with two-terminal devices. It is also desirable to provide devices that allow designers some choice of logical functionality. Although it is possible to construct an arbitrary optical computer from two input NOR gates alone, an improved architecture may be used when more complex gates are available. Finally, it is important that the devices operate at high speeds with low power requirements. The self electro-optic effect devices (SEEDs) disclosed in U.S. Pat. No. 4,546,244 of D. A. B. Miller, Oct. 8, 1985, satisfy all of these requirements. SEEDs rely on changes in optical absorption that are induced by changes in an electric field applied perpendicular to thin semiconductor layers in multiple quantum well material. Typically the quantum wells are contained in the intrinsic region of a reverse biased p-i-n diode. When combined with an appropriate load, the resultant device has opto-electronic feedback and bistability. Since the first demonstration of a simple resistor-biased SEED, much of the subsequent effort has concentrated on enhancing the functionality of the devices. More functionality is achieved in SEEDs by having more than one light beam incident on several p-i-n diodes. For example, by replacing the resistive load with a photodiode illuminated by a visible ($\lambda = 633$ nm) beam, a diode biased SEED (D-SEED) is operable over many decades in power by adjusting the light on the photodiode. The beam incident on the photodiode may, for example, control the light output from the quantum well diode; such a device serves as a memory, holding its state for up to thirty seconds when both the visible and infrared beams are removed. A second example, the symmetric SEED (S-SEED) disclosed in U.S. Pat. No. 4,754,132 of H. S. Hinton et al., Jun. 28, 1988, consists of two quantum well p-i-n diodes electrically connected in series. It has time-sequential gain, provides for signal timing regeneration, is insensitive to optical power supply fluctuations and provides effective input-output isolation. Because the signal inputs and outputs are differential in nature, specific logic power levels need not be defined and operation of the device is possible over a power range spanning several decades. Thus, the S-SEED satisfies the most basic requirement in that it is easy to use. It also has flexible logic functionality in that it can act either as an optical set-reset latch or as a differential logic gate capable of NOR, OR, NAND, and AND functions as disclosed in the A. L. Lentine et al., paper "Photonic Ring Counter and Differential Logic Gate using the Symmetric Self-Electroptic Effect Device", *Conference on Lasers and Electro-Optics* (Optical Society of America), Apr. 1988. Additional functionality is obtained by extending the S-SEED concept to more than two diodes in series as in the multistate self electro-optic effect devices (M-SEEDs) disclosed in U.S. Pat. No. 4,800,262 A. L. Lentine, Jan. 24, 1989. M-SEEDS may operate as optically enabled S-SEEDs, image thresholding devices, or multi-input selection devices.

The P. Wheatley et al. paper, "Hard Limiting Optoelectronic Logic Devices", *Photonic Switching: Proceedings of the First Topical Meeting*, Mar. 1987, discloses two opto-electronic devices suitable for optical logic. Both devices have a phototransistor in series with an electro-absorption modulator between a constant supply voltage and ground. A beam of constant optical power, the pump power, is incident on the modulator; part of this is absorbed by the modulator to give rise to photocurrent and part is transmitted to give the optical output of the device. Thus the device is an optical three terminal device since the output power is derived from a constant optical supply which does not follow the same path as the input signal. The first device disclosed in the Wheatley is an inverting device where the wavelength of the pump beam is such that the modulator photocurrent increases with the applied reverse bias voltage. In the second, non-inverting device, the modulator absorption decreases with applied reverse bias voltage. As disclosed, multiple-input logic gates are made by employing several phototransistors. Using the wavelength of the first, inverting device, a NOR gate may be made if two phototransistors are connected in parallel, and a NAND gate if they are connected in series. The second, noninverting device may be made into an OR or AND gate with the transistors in parallel or series respectively. A problem with the disclosed Wheatley devices, as well as the known SEED logic arrangements referenced above, is that optical cascading is required to implement more complex logic functions, for example, $E = AB + CD$, and corresponding increased optical delays and losses result because of the cascading. Ancillary problems of the Wheatley devices include the lack of a complementary optical output and the inability to store information such that the input beam can be removed before the output beam is transmitted in time-sequential fashion, as is typically done with S-SEEDs.

SOLUTIONS

These problems are solved and a technical advance is achieved in accordance with the principles of the invention in an exemplary apparatus where a plurality of photodetectors are interconnected to form an electrical circuit corresponding to, advantageously, any given logic function comprising at least two of the four basic AND, OR, NAND, and NOR logic operations, and where the apparatus performs optical logic without optical cascading since the electrical circuit controls the generation of an optical output beam based on the value that the given logic function assumes in response to a plurality of optical signal beams each incident on at least one of the photodetectors. Illustratively, a complementary optical output is obtained and time-sequential operation is effected when two, serially connected quantum well p-i-n diodes comprising a S-SEED are used to generate optical output beams in response to the voltage developed by the electrical circuit of interconnected photodetectors.

Apparatus in accordance with the invention comprises an output device that generates an optical output beam and a plurality of photodetectors interconnected to form an electrical circuit for electrically controlling the output device. The circuit corresponds to a logic function comprising at least two operations from the group of logic operations consisting of AND, OR, NAND, and NOR. The circuit is connectable to a voltage source and is responsive to a plurality of optical signal beams each incident on at least one of the photodetectors such that the circuit controls the generation of the optical output beam at a first logic value when the logic function of the plurality of optical signal beams is a first value, and at a second logic value when the logic function is a second value.

Illustratively, any AND and NAND operations of the logic function correspond to series connections within the circuit and any OR and NOR operations correspond to parallel connections within the circuit. A reference photodetector connected in series with the circuit responds to an optical reference beam by generating an initial photocurrent greater than an initial photocurrent generated by the circuit when the logic function is the first value, and by generating an initial photocurrent less than an initial photocurrent generated by the circuit when the logic function is the second value. The power of the reference and signal beams may be controlled, for example using optical attenuators, such that the initial photocurrents generated by the photodetectors result in the required photocurrent relationships to achieve the logic function.

In the exemplary embodiments disclosed herein, the reference photodetector and the interconnected photodetectors of the circuit are implemented as quantum well p-i-n diodes. Although not needed for optical modulations, the quantum wells result in improved switching performance of the diodes. The optical reference beam is transmitted from another quantum well p-i-n diode with the same characteristics, to reduce the need for critical biasing.

The circuit controls the generation of an optical output beam and a complementary output beam by a pair of series-connected quantum well p-i-n diodes comprising a S-SEED. The optical signal beams are first applied to set the state of the apparatus and optical clock beams are then applied to the p-i-n diodes of the S-SEED to read the state of the apparatus in time sequential fashion.

DRAWING DESCRIPTION

FIGS. 8 and 9 are tables defining photocurrent relationships for the embodiments of FIGS. 7 and 6 respectively.

DETAILED DESCRIPTION

Figure 1:
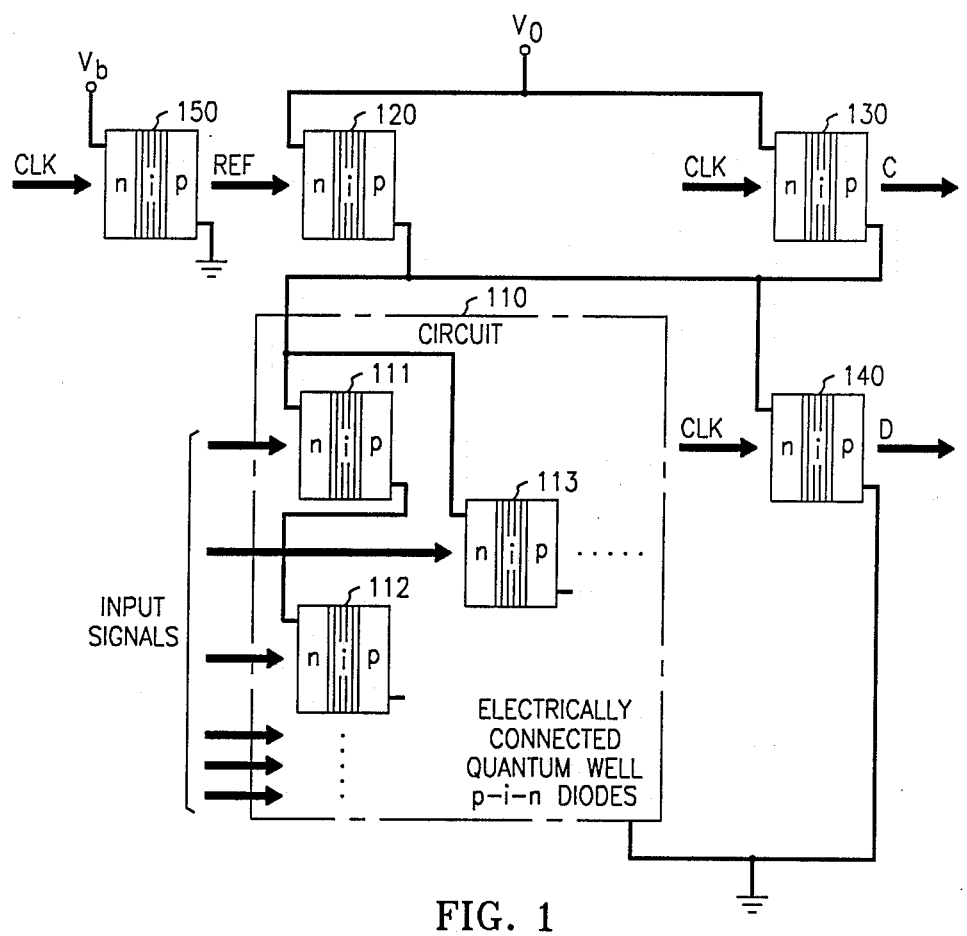
FIG. 1 is a general circuit diagram for single-ended optical logic arrangements illustrative of the present invention.

FIG. 1 is a general circuit diagram for single-ended optical logic arrangements illustrative of the present invention. Although in many cases the same quantum well p-i-n diodes are used for the detection and modulation processes, for simplicity, the circuits described herein, with the exception of the circuit of FIG. 6, have one set of several diodes on which the optical signal beams are incident (signal diodes), one diode on which the reference beam is incident (reference diode), and two diodes that generate the output beams from a pair of incident, equal power clock beams (output S-SEED). Any two (or N) parallel-connected diodes are replaceable by a single diode with an optical window large enough for two (or N) beams. The circuits described herein use only quantum well p-i-n diodes, but in fact, it is not necessary that the diode with the incident input beams have quantum wells, although improved switching performance results if they do. The improved switching performance results from the increase in absorption of the quantum well diode with reducing voltage; this change in absorption tends to further enhance the difference in photocurrents between the diodes hence switching them faster. The apparatus is operated by setting the state of the apparatus relatively low power input signal and reference beams, and subsequently reading out the state using a pair of equal, high power clock beams, thus achieving the same time-sequential gain mechanism that is present in the S-SEED.

The operation of the logic gate is described below. First, the signal beams are applied to the diodes, 111, 112, 113, etc., of circuit 110 and the reference beam is applied to diode 120. The reference beam is provided by passing a previous clock beam through a quantum well modulator 150 with a fixed voltage $V_b$ on it. The reference beam and signal beams are not only derived from the same (clock) laser, but also pass through quantum well p-i-n diodes with the same characteristics, further reducing the need for critical biasing. The voltage present on the node between circuit 110 and reference diode 120 is a function of the generated currents. For non-inverting functions (i.e. combinations of ANDs and ORs), the reference beam power level is adjusted so that the voltage across reference diode 120 is essentially zero if the logic function is not satisfied. This occurs if the photocurrent generated by the reference diode 120 is initially greater than that generated by circuit 110. The reference beam power level is also adjusted so that the voltage across reference diode 120 is essentially equal to the supply voltage $V_0$ if the logic function is satisfied. In this case, the photocurrent generated by reference diode 120 is initially less than that generated by circuit 110. The two cases give a range of power levels for the reference beam, so there is no critical biasing. If quantum well p-i-n diodes are used for the detectors, there is a range of input power levels where bistability exists. Therefore, it is necessary in the two cases given above that the photocurrent generated in reference diode 120 is sufficiently greater or less than that generated by circuit 110 so that the resultant voltage across reference diode 120 is uniquely defined (i.e. outside of the bistable loop) for all sets of input signals. An alternative is to ramp the supply voltage $V_0$ up from zero during the application of the input signals and reference beam, effectively removing any bistable characteristics. Using photodetectors without a negative region (for example, detectors without quantum wells) for the diode with incident input signals also removes the bistable characteristics.

Since the center node of the output S-SEED, comprising quantum well p-i-n diodes 130 and 140, is tied to the point between reference diode 120 and circuit 110, once the voltage at this point has been determined (i.e. after the switching time of the circuit), the signal beams are removed and the higher power clock beams applied to read out the state of the apparatus at higher power, thus achieving time-sequential gain. However, bistability is required to read the state of the apparatus; accordingly, the output S-SEED must have a bistable region when applying the clock signals. To ensure this, the circuits operate at a wavelength where there is more absorption at low voltages than at high voltages, ensuring a region of bistability. Thus, for the description herein, low voltage corresponds to low optical output, and high voltage corresponds to high optical output. Output signal C of FIG. 1 is a non-inverting output ("high" when the logic function is satisfied), because, as stated above, the voltage across reference diode 120 is essentially equal to the power supply voltage $V_0$ when the logic function is satisfied. Since output signal D is complementary to output C, it is inverting output. For example, output D is used for NOR and NAND gates. It is possible to operate at wavelengths where there is no bistability in the S-SEED, for example, at larger wavelengths where absorption increases with increasing voltage, but then there is no gain mechanism. The use of phototransistors for the detector diodes could provide this gain mechanism with possible energy efficiency improvement.

Figure 2:
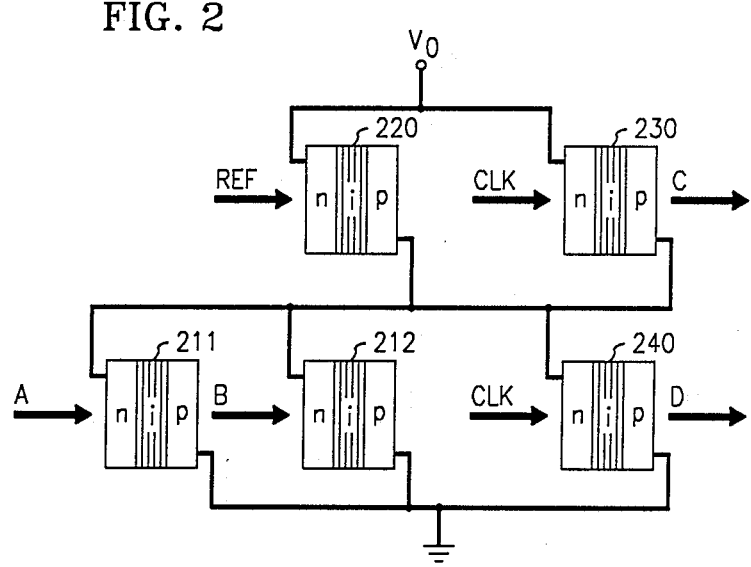
FIGS. 2-7 are circuit diagrams for specific embodiment of arrangements of the type shown in FIG. 1.

The signal diodes for the OR/NOR arrangement of FIG. 2 consists of two parallel-connected quantum well diodes 211 and 212, with respective input signals A and B. For OR operation, if either of the signals A and B is a logic "one" the output is a logic "one"; otherwise the output is logic "zero". The constraint on the reference beam power is as follows. Assuming equal responsivity for all diodes, if the sum of the powers of the two input signals is sufficiently less than the reference beam power when both inputs are logic "zeros", essentially zero volts is present across the reference diode 220. Because diode 230 of the output S-SEED is connected in parallel with reference diode 220, output C is "low" when the clock beams are applied. Conversely, if the sum of the powers of the two input signals is sufficiently greater than the reference beam power when at least one input is a logic "one", essentially the supply voltage $V_0$ appears across reference diode 220, and output C is "high" when the clock beams are applied. The bistable characteristics during the application of the signals can be eliminated by momentarily turning off the DC power supply, so that the apparatus acts as a true optical comparator. It follows directly that the reference beam power must be between twice the power of a logic "zero" and the sum of the power of a logic "zero" and a logic "one".

Since output D generated by diode 240 is complementary to output C, D is the NOR of A and B. An AND/NAND gate is realizable using the same circuit arrangement by choosing the reference beam power between the sum of the power of a logic "zero" and a logic "one" and twice the power of a logic "one". A logic arrangement having an output that is a logic "one" when M of N inputs are "high" has N diodes, each with one input, connected in parallel. The range of reference beam power levels for this logic arrangement is given by:

$$(M-1)P_{LOGIC\,1}+(N-M+1)P_{LOGIC\,0}<P_{REFERENCE}<(M)P_{LOGIC\,1}+(N-M)P_{LOGIC\,0}$$

where $M=1$ for an OR/NOR gate, $M=N$ for an AND/NAND gate, and $M=N=1$ for an inverter/buffer or D-flip-flop. An optimum value for the reference beam may be chosen in the middle of the two edges of the inequality. In this case the reference beam amplitude is given by:

$$P_{REFERENCE}=((2M-1)P_{LOGIC\,1}+([2N-2M+1]P_{LOGIC\,0})/2$$

Since the constraints on the reference beam power become tight for large N, this logic gate is most useful for a small number of inputs.

Figure 3:
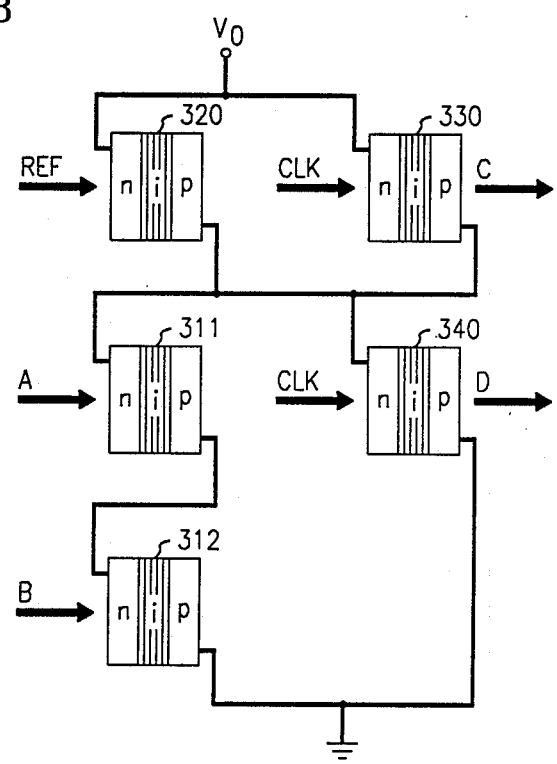

The AND/NAND logic arrangement of FIG. 3 is particularly useful for combination with other logic functions. The signal inputs, A and B, are incident respectively on two serially connected diodes 311 and 312. Including the reference signal, the inputs are thus incident on three serially connected quantum well p-i-n diodes 320, 311 and 312. For equal power input light beams, the apparatus of FIG. 3 has three states, each state corresponding to one p-i-n diode having essentially the supply voltage $V_0$ across it (and higher optical output) and the other two diodes having essentially zero volts across them. If the voltage $V_0$ is ramped up from zero while applying the input signals (effectively removing any bistable characteristics), the diode with the least incident optical power has essentially the supply voltage $V_0$ across it. Otherwise, a particular diode must have input signals with sufficiently less power than the other two to uniquely determine the apparatus state outside the bistable regions. In operation as an AND gate, the output is a logic "logic" only if both inputs are logic "ones"; otherwise the output is a logic "zero". Assuming the reference beam power is greater than that of a logic "zero", if either of signals A or B are logic "zeros" then the particular diode with the logic "zero"-'input has essentially the supply voltage $V_0$ across it and the others (including the reference diode 320) have essentially zero volts across them. If both signals are logic "zeros", the diode with the input logic "zero" with the least power (assuming some small inequality exists) has essentially the supply voltage $V_0$ across it, and reference diode 320 still has essentially zero volts across it. Because diode 330 of the output S-SEED is connected in parallel with reference diode 320, when the clock beams are applied, output C is "low". If the reference beam power is less than that of a logic "one", when inputs A and B are both logic "logic", reference diode 320 has the least incident power and essentially the supply voltage $V_0$ across it. Therefore, when the clocks are applied, output C is "high". Thus, if the reference beam is between a logic "zero" and a logic "one", the circuit arrangement of FIG. 3 performs an AND function. Since the two outputs of the S-SEED are complementary, output D generated by diode 340 is the NAND of the two inputs A and B.

An N input AND/NAND gate is realized by connecting N diodes, each with one of the N incident signal beams, in series with the reference diode. The constraint on the reference beam power level for this gate is that the power level in the reference beam is between a logic "zero" power level and a logic "one" level (assuming no bistable loop). In this case, the multi-input AND/-NAND gate has the same signal tolerances regardless of the number of inputs, and it can be easily shown that it also has the same switching energy. Thus, this N input AND/NAND gate is useful for large fan-ins. One practical constraint that may limit operation for very large N is the finite forward voltage that appears across the diodes that are in the low state, i.e. they are photovoltaic. The presence of this voltage does not alter the basic function of the device, but the sum of the forward voltages must not be so large as to cause breakdown in the diode in the "high" state.

Figure 4:
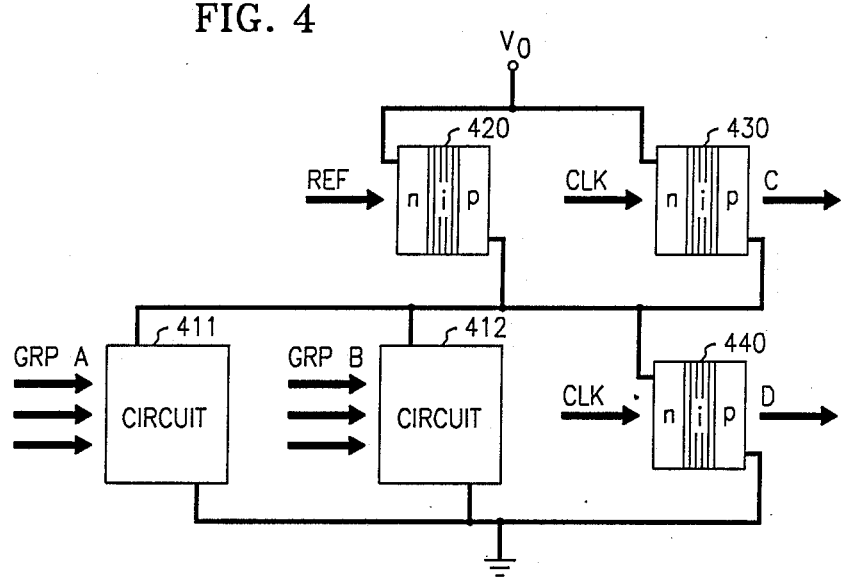
Figure 5:
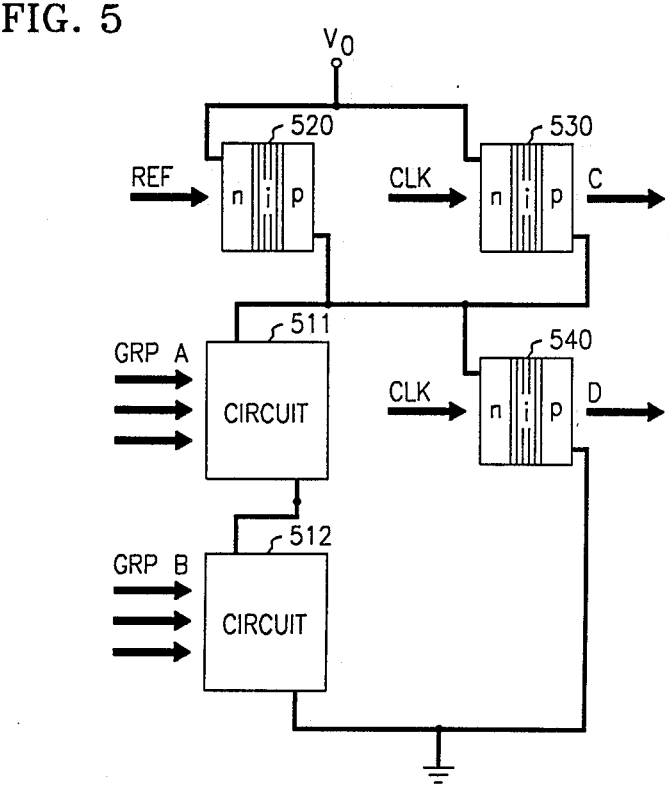
Figure 6:
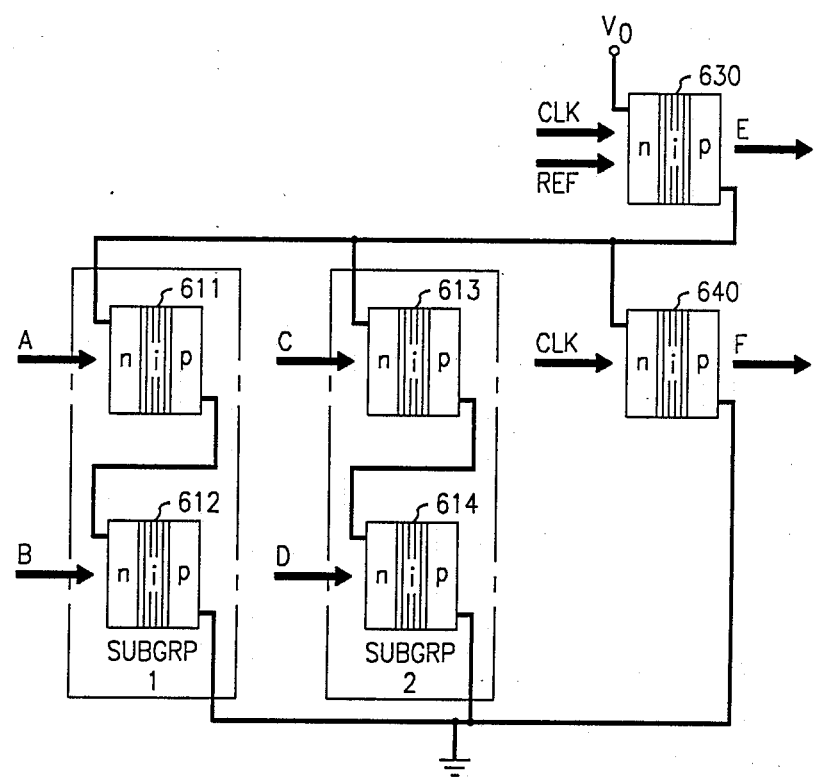

An important advantage of single-ended optical logic arrangements of the type shown in FIG. 1 relates to the implementation of arbitrary functions with such arrangements. The arrangement of FIG. 4 implements the OR of two subfunctions, by connecting circuits 411 and 412, corresponding to the subfunctions, in parallel. The arrangement of FIG. 5 implements the AND of two subfunctions, by connecting circuits 511 and 512, corresponding to the subfunctions, in series. One example of such a function is $E=AB+CD$. The circuit arrangement for implementing this function is shown in FIG. 6. Note that the reference diode and the top diode of the output S-SEED are combined into one diode 630. Subgroup 1, consisting of two p-i-n diodes 611 and 612 connected electrically in series, performs the AND of A and B. Subgroup 2, also consisting of two diodes 613 and 614 in series, performs the AND of C and D. By connecting subgroups 1 and 2 in parallel, the circuit performs the desired OR of AB and CD. We can generalize this circuit to include p parallel-connected groups of $s_p$ series diodes, where each group of serially connected diodes need not have the same number of diodes, to realize a programmable logic array (i.e. the ORs of many ANDs).

Figure 7:
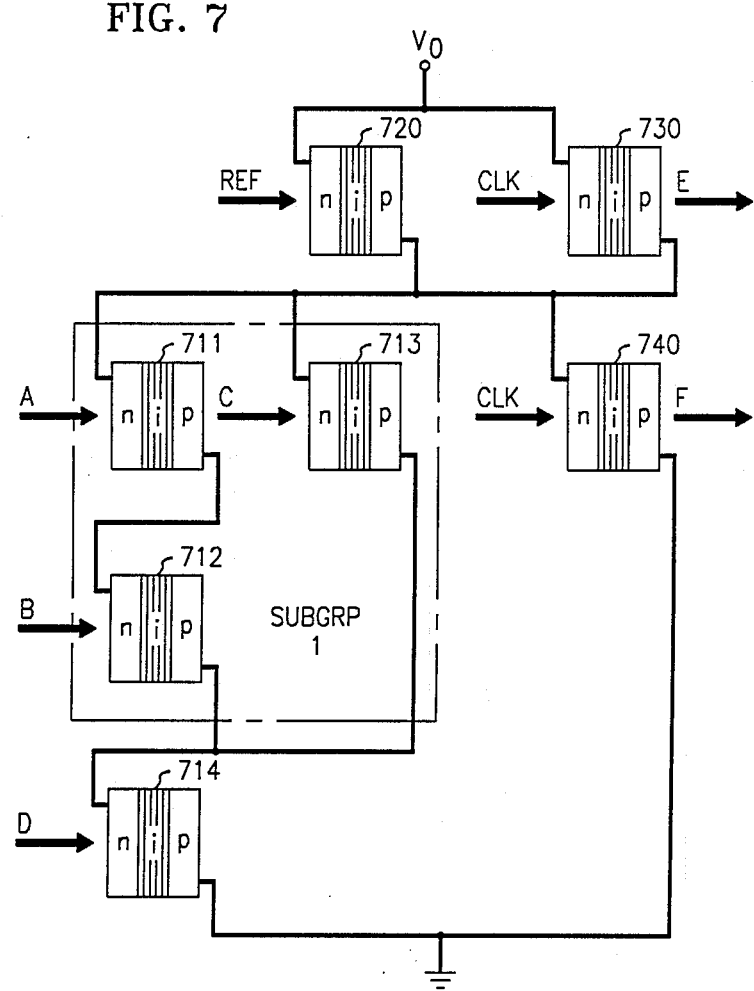

Next consider another arbitrary function given by $E=(AB+C)D$, implemented by the arrangement of FIG. 7. First, AB is implemented with serially connected diodes 711 and 712. A diode 713 in parallel with this serial group performs the OR of AB and C. The three diodes 711, 712 and 713 comprise subgroup 1. An additional diode 714 is connected in series with subgroup 1 to perform the AND function of (AB+C) and D. Then subgroup 1 is connected in series with reference diode 720 to provide the output voltage at the center node of the output S-SEED comprising diodes 730 and 740.

In the arrangement of FIG. 7, the contrast ratio of the input signals must be greater than 2:1 for the arrangement to properly perform the logic function. This is true because a logic "one " for input beam D must generate more current than logic "zeros" on input beams A, B, and C. Since diode 713 with incident beam C is connected in parallel with the set of diodes 711 and 712 with incident beams A and B, the contribution of the currents of any one of three diodes 711, 712 and 713 is twice that of diode 714 with input beam D. Optical attenuators may be added to achieve optimum performance, particularly when the input signals have small contrast ratios between the two logic levels. The optical attenuators are, in general, different for each diode. They may either be fabricated as part of the devices or may be a patterned array of attenuators placed in the image plane of the device. Again, if the input contrast ratio is sufficient (this is dependent on the particular circuit), the attenuators are not needed. Calculations are next described for the appropriate values of the attenuators under the assumption that the logic arrangement is to operate for contrast ratios greater than one. This minimizes the effects of optical power level non-uniformities for greater contrast ratios.

The method used to calculate the optimum values for the attenuators is to choose those values that would allow the system to be in a perfect unstable equilibrium. In such a situation, the system is most sensitive to any slight perturbation of the inputs that would lead to switching. Therefore, assuming equal power incident beams and all diodes having the same responsivity, equal currents are generated for all diodes. All diodes in the circuit are considered to be biased at an unstable equilibrium point, and only one such point will exist so that this is true for all diodes. Indeed, the device will be in such a state, provided that the voltage is ramped up from zero while the signals are applied; otherwise the bistability in the system will prevent this from happening. To illustrate this method of calculating the values for the attenuators, consider the arrangement of FIG. 7. First consider the current generated by the diodes in subgroup 1. If equal currents are generated by each diode, then the series current subgroup 1 is twice that in diode 714 with input beam D. Therefore, the input signals incident on the diodes in subgroup 1 need to be attenuated by 50%. Although this is a simple example, this technique applies to more complex arrangements as well.

Equally important is the calculation of the constraints on the reference beam power in an arbitrary circuit. In general, the truth table is written for the circuit and the contribution of each diode to the overall current in the circuit is calculated. Again, assume that all diodes have the same responsivity. The contribution of serially connected subgroups is equal to the minimum of the subgroups, and the contribution of parallel-connected subgroups is equal to the sum of the currents in each subgroup. Then the largest of the currents where the function is a logic "zero" is determined as well as the smallest of the currents where the function is a logic "one". Assuming no bistability while the input signals are applied, the reference beam should generate a current between these two currents. Otherwise, the reference beam is constrained such that the ratio of the current generated by the signal diodes to the current generated by the reference diode in the case where the function is satisfied exceeds a critical factor k, required to uniquely determine the state of the apparatus. Conversely, the ratio of the current generated by the signal diodes to the current generated by the reference diode in the case where the function is not satisfied must be less than $1/k$. It is possible that, for some circuits, both of these conditions cannot be met unless the input signals sufficient contrast ratio or, as discussed above, the bistability is removed during the application of the signals.

The truth table and the currents generated for the circuit in FIG. 7 are shown in FIG. 8. The currents are calculated under the assumption that input beams A, B, and C are attenuated by 50%, the responsivity is chosen for simplicity to be a constant value of 1 A/W, and the bistability is removed during the application of the input signals. (All currents scale with responsivity, which, although not constant, averages about 0.3 A/W from 0 to 15 volts for one of the quantum well diodes.) From the last column in FIG. 8, the constraints on the reference beam power level are:

$$P_{LOGIC0} > P_{REFERENCE} 0.5(P_{LOGIC1} + P_{LOGIC 0}).$$

The optimum power level for the reference beam is halfway in between the two sides of the inequality. In this case the reference beam power level is equal to $(\frac{1}{4})P_{LOGIC1} + (\frac{3}{4})P_{LOGIC0}$.

FIG. 9 shows the truth table for the circuit in FIG. 6. No attenuators are needed in this circuit. From the last column in FIG. 9, the constraints on the reference beam power level are $$2P_{LOGIC0} < P_{REFERENCE} < P_{LOGIC1}P_{LOGIC 0}.$$

Choosing reference beam power halfway in between the two sides of the inequality gives us a reference beam power level of $(\frac{1}{2})P_{LOGIC 1} + (3/2)P_{LOGIC 0}$.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. Apparatus comprising
   means for generating an optical output beam, and
   a plurality of photodetector means interconnected to form an electrical circuit for electrically controlling said generating means, said circuit corresponding to a logic function comprising at least two operations from the group of logic operations consisting of AND, OR, NAND, and NOR, said circuit being connectable to a voltage source and responsive to a plurality of optical signal beams each incident on at least one of said photodetector means such that said circuit controls the generation of said optical output beam at a first logic value when said logic function of said plurality of optical signal beams is a first value, and at a second logic value when said logic function of said plurality of optical signal beams is a second value.

2. Apparatus in accordance with claim 1 where any AND and NAND operations of said logic function correspond to series connections within said circuit and where any OR and NOR operations of said logic function correspond to parallel connections within said circuit.

3. Apparatus in accordance with claim 1 wherein each of said plurality of photodetector means comprises a p-i-n diode.

4. Apparatus in accordance with claim 1 wherein each of said plurality of photodetector means includes a semiconductor quantum well region.

5. Apparatus in accordance with claim 1 further comprising
   photodetector means, connected in series with said circuit for connection across said voltage source, and responsive to an optical reference beam for generating an initial photocurrent greater than an initial photocurrent generated by said circuit when said logic function of said plurality of optical signal beams is said first value and for generating an initial photocurrent less than an initial photocurrent generated by said circuit when said logic function of said plurality of optical signal beams is said second value.

6. Apparatus in accordance with claim 5 wherein said plurality of photodetector means and said photodetector means connected in series with said circuit each comprise a p-i-n diode.

7. Apparatus in accordance with claim 5 wherein said plurality of photodetector means and said photodetector means connected in series with said circuit each include a semiconductor quantum well region.

8. Apparatus in accordance with claim 7 further comprising
   means for transmitting said optical reference beam to said photodetector means connected in series with said circuit, said transmitting means comprising a p-i-n diode quantum wells in an intrinsic region thereof.

9. Apparatus in accordance with claim 1 further comprising
   photodetector means, connected in series with said circuit for connection across said voltage source, and responsive to an optical reference beam,
   where the powers of said optical signal beams and said optical reference beam are such that said photodetector means connected in series with said circuit generates an initial photocurrent that is greater than an initial photocurrent generated by said circuit when said logic function of said plurality of optical signal beams is said first value and photodetector means connected in series with said circuit generates an initial photocurrent that is less than an initial photocurrent generated by said circuit when said logic function of said plurality of optical signal beams is said second value.

10. Apparatus in accordance with claim 1 further comprising
    means electrically connected to said circuit for generating a beam that is complementary to said optical output beam.

11. Apparatus in accordance with claim 10 wherein said means for generating said complementary beam includes a semiconductor quantum well region.

12. Apparatus in accordance with claim 11 wherein said means for generating said complementary beam comprises a p-i-n diode.

13. Apparatus in accordance with claim 1 wherein said generating means comprises
    optical modulator means responsive to an optical clock beam for generating said optical output beam.

14. Apparatus in accordance with claim 13 wherein said plurality of optical signal beams are first applied to set the state of said apparatus and said optical clock beam is subsequently applied to read the state of said apparatus.

15. Apparatus in accordance with claim 14 further comprising
    means electrically connected to said circuit for generating a beam that is complementary to said optical output beam.

16. Apparatus in accordance with claim 13 wherein said optical modulator means includes a semiconductor quantum well region.

17. Apparatus in accordance with claim 16 wherein said optical modulator means comprises a p-i-n diode.

18. Apparatus comprising
    means for generating an optical output beam,
    a plurality of photodetector means interconnected to form an electrical circuit for electrically controlling said generating means, said circuit corresponding to a logic function, said circuit connectable to a voltage source and responsive to a plurality of optical signal beams each incident on at least one of said photodetector means such that said circuit controls the generation of said optical output beam at a first logic value when said logic function of said plurality of optical signal beams is a first value, and at a second logic value when said logic function of said plurality of optical signal beams is a second value, and means electrically connected to said circuit for generating a beam that is complementary to said optical output beam.

19. Apparatus comprising optical modulator means responsive to an optical clock beam for generating an optical output beam, and a plurality of photodetector means interconnected to form an electrical circuit for electrically controlling said optical modulator means, said circuit corresponding to a logic function, said circuit being connectable to a voltage source and responsive to a plurality of optical signal beams each incident on at least one of said photodetector means such that said circuit controls the generation of said optical output beam at a first logic value when said logic function of said plurality of optical signal beams is a first value, and at a second logic value when said logic function of said plurality of optical signal beams is a second value, wherein said plurality of optical signal beams are first applied to set the state of said apparatus and said optical clock beam is subsequently applied to read the state of said apparatus.

20. Apparatus comprising a plurality of photodetector means interconnected to form an electrical circuit that corresponds to a logic function comprising at least two operations from the group of logic operations consisting of AND, OR, NAND, and NOR, said circuit being connectable to a voltage source and responsive to a plurality of optical signal beams each incident on at least one of said photodetector means such that said circuit develops a voltage at a first level when said logic function of said plurality of optical signal beams is a first value and at a second level when said logic function of said plurality of optical signal beams is a second value, and means electrically connected to said circuit for generating an optical output beam having a first logic value in response to said level of said voltage and having a second logic value in response to said second level of said voltage.

21. Apparatus comprising a symmetric self electro-optic effect device comprising a first p-i-n diode having quantum wells in an intrinsic region thereof and responsive to an optical clock beam for generating an optical output beam, said first p-i-n diode having a first terminal connectable to a first terminal of a voltage source, said device further comprising a second p-i-n diode having quantum wells in an intrinsic region thereof and responsive to an optical clock beam for generating a beam that is complementary to said optical output beam, said first p-i-n diode having a first terminal connectable to a second terminal of said first p-i-n diode and having a second terminal connectable to a second terminal of said voltage source, a plurality of p-i-n diodes interconnected to form an electrical circuit corresponding to a logic function of a plurality of optical signal beams, said circuit having a first terminal connectable to said second terminal of said voltage source and having a second terminal connected to said second terminal of said first p-i-n diode and said first terminal of said second p-i-n diode, each of said p-i-n diodes of said circuit having at least one of said optical signal beams incident thereon, and a p-i-n diode responsive to an optical reference signal and having a first terminal connectable to said first terminal of said voltage source and having a second terminal connected to said second terminal of said circuit.

22. Apparatus in accordance with claim 21 wherein said logic function comprises at least two operations from the group of logic operations consisting of AND, OR, NAND, and NOR.

* * * * *

UNITED STATES PATENT AND TRADEMARK OFFICE
CERTIFICATE OF CORRECTION

PATENT NO. : 4,967,068

DATED : October 30, 1990

INVENTOR(S) : Anthony L. Lentine and David A. B. Miller

It is certified that error appears in the above-identified patent and that said Letters Patent is hereby corrected as shown below:

On the title page, item [75] Inventors:

"Anthony L. Lentine, St. Charles; David A. B. Miller, Fairhaven, both of N.J." should be "Anthony L. Lentine, St. Charles, Ill.; David A. B. Miller, Fairhaven, N.J.";

Column 1, line 52, "($\lambda$=633 nm)" should be "($\lambda$=633nm)":

Column 6, lines 4-6, "$(M-1)P_{LOGIC1}+(N-M+1)P_{LOGIC0}<PREFERENCE<(M)P_{LOGIC1}+(N-M)P_{LOGIC0}$" should be "$(M-1)P_{LOGIC1}+(N-M+1)P_{LOGIC0}<P_{REFERENCE}<(M)P_{LOGIC1}+(N-M)P_{LOGIC0}$";

Column 6 lines 15-16 "$P_{REFERENCE}=((2M-1)P_{LOGIC1}+([2N-2M+1]P_{LOGIC0})/2$" should be "$P_{REFERENCE}=((2M-1)P_{LOGIC1}+(2N-2M+1)P_{LOGIC0})/2$";

Column 9, line 1, "$P_{LOGIC0}>P_{REFERENCE}0.5(P_{LOGIC1}+P_{LOGIC0})$." should be "$P_{LOGIC0}<P_{REFERENCE}<0.5(P_{LOGIC1}+P_{LOGIC0})$.

UNITED STATES PATENT AND TRADEMARK OFFICE
CERTIFICATE OF CORRECTION

PATENT NO. : 4,967,068  PAGE 2 OF 2
DATED : October 30, 1990
INVENTOR(S) : Anthony L. Lentine and David A. B. Miller It is certified that error appears in the above-identified patent and that said Letters Patent is hereby corrected as shown below:

Column 9, line 12, "$2P_{LOGIC0} < P_{REFERENCE} < P_{LOGIC1} P_{LOGIC0}.$"

should be "$2P_{LOGIC0} < P_{REFERENCE} < P_{LOGIC1} + P_{LOGIC0}.$";

Column 10, line 12, after "diode" insert "having";
Column 10, line 68, after "circuit" insert "being";
Column 12, line 6, "said level" should be "said first level".

Signed and Sealed this

Twenty-eighth Day of July, 1992

Attest:

DOUGLAS B. COMER

Attesting Officer          Acting Commissioner of Patents and Trademarks